US006086502A

United States Patent [19]

Chung

[11] Patent Number: 6,086,502

[45] Date of Patent: Jul. 11, 2000

[54] SWITCHING DEVICE OF REDUCTION GEAR SET

[76] Inventor: Lee Hsin-Chih Chung, No. 21-8, Shang San Cho Woo, Wuchang-Li, Chungli City, Taoyuan Hsien, Taiwan

[21] Appl. No.: 09/265,078

[22] Filed: Mar. 9, 1999

[51] Int. Cl.$^{7}$ .......... F16H 3/54

[52] U.S. Cl. .......... 475/299; 475/317

[58] Field of Search .......... 475/299, 317

[56] References Cited

U.S. PATENT DOCUMENTS 1,245,692 11/1917 Dickman .......... 475/299
4,791,833 12/1988 Sakai et al. .......... 475/299
5,816,189 10/1998 Olofsson .......... 475/299

FOREIGN PATENT DOCUMENTS 1-203741 8/1989 Japan .......... 475/299

*Primary Examiner*—Sherry L. Estremsky
*Attorney, Agent, or Firm*—Ostrolenk, Faber, Gerb & Soffen, LLP

[57] ABSTRACT

A switching device of reduction gear set is coupled to and drive by a planetary gear system for driving an output tool. The switching device includes a casing defining an interior space having an inside surface on which an internal gear is formed. The casing also defines two opposite elongate slots. A switching member is received in the casing and movable between a first position and a second position. The switching member includes a cylindrical body forming an inner ring gear serving as a ring gear of the planetary gear system and engaging with planet gears of the planetary gear system and an outer ring gear which engages with the internal gear of the casing and thus prevents the switching member from rotation when the switching member is at the first position and disengages from the internal gear of the casing and thus frees the switching member to rotate when the switching member is at the second position, the switching member comprising a driving member rotatably fit over the cylindrical body thereof and being axially fixed thereto, the driving member having extensions projecting beyond the casing through and axially movable along the slots thereof thereby by manually moving driving member, the switching member is moved between the first and second positions for changing output speed of the tool.

3 Claims, 5 Drawing Sheets

SWITCHING DEVICE OF REDUCTION GEAR SET

FIELD OF THE INVENTION

The present invention generally relates to a power tool having a reduction gear set, and in particular to a switching device of the reduction gear set which allows an output speed of the power tool to be selectively changed.

BACKGROUND OF THE INVENTION

Power tools driven by electrical motors are usually equipped with a reduction gear set. A switching device is also provided for selectively changing an output speed of the power tools. The switching device comprises a manual switch that is coupled to a cylindrical switching member axially movably received in a casing. The switching member has an inner gear serving as a ring gear of a planetary system coupled to and driven by the motor and an outer ring gear selectively engageable with an internal gear formed on an inside surface of the casing. The manual switch moves the switching member between an engaged position where the outer ring gear of the switching member engages with the internal gear of the casing and is thus prevented from rotation and a disengaged position where the outer ring gear of the switching member disengages from the internal gear of the casing and thus allows the switch member to rotate. This changes the output speed of other gearing system coupled to and driven by the planetary gear system associated with the switching member.

FIG. 5 shows an example of the conventional switching device of the power tool. Conventionally, the switching device comprises an arc member driven by the manual switch and slidably fit over an outside surface of the casing. The arc member has inwardly-extending projections extending through slots defined in the casing to drivingly engage with the switching member thereby forming a driving coupling between the manual switch and the switching member. Since extending the inwardly-extending projections through the slots to engage with the switching member is difficult and the structure is complicated, it is desired to have a simplified switching device that allows easy assembly thereof.

OBJECTS OF THE INVENTION

Therefore, an object of the present invention is to provide a switching device of reduction gear set of a power tool which has a simplified structure.

Another object of the present invention is to provide a switching device of reduction gear set of a power tool which allows easy assembly thereof.

To achieve the above objects, in accordance with the present invention, there is provided a switching device of reduction gear set coupled to and drive by a planetary gear system for driving an output tool. The switching device comprises a casing defining an interior space having an inside surface on which an internal gear is formed. The casing also defines two opposite elongate slots. A switching member is received in the casing and movable between a first position and a second position. The switching member comprises a cylindrical body forming an inner ring gear serving as a ring gear of the planetary gear system and engaging with planet gears of the planetary gear system and an outer ring gear which engages with the internal gear of the casing and thus prevents the switching member from rotation when the switching member is at the first position and disengages from the internal gear of the casing and thus frees the switching member to rotate when the switching member is at the second position, the switching member comprising a driving member rotatably fit over the cylindrical body thereof and being axially fixed thereto, the driving member having extensions projecting beyond the casing through and axially movable along the slots thereof thereby by manually moving driving member, the switching member is moved between the first and second positions for changing output speed of the tool.

BRIEF DESCRIPTION OF THE DRAWINGS

The present invention will be better understood from the following description of a preferred embodiment thereof, which is illustrative and not limitative, with reference to the attached drawings, wherein.

DETAILED DESCRIPTION OF THE PREFERRED EMBODIMENT

Figure 1:
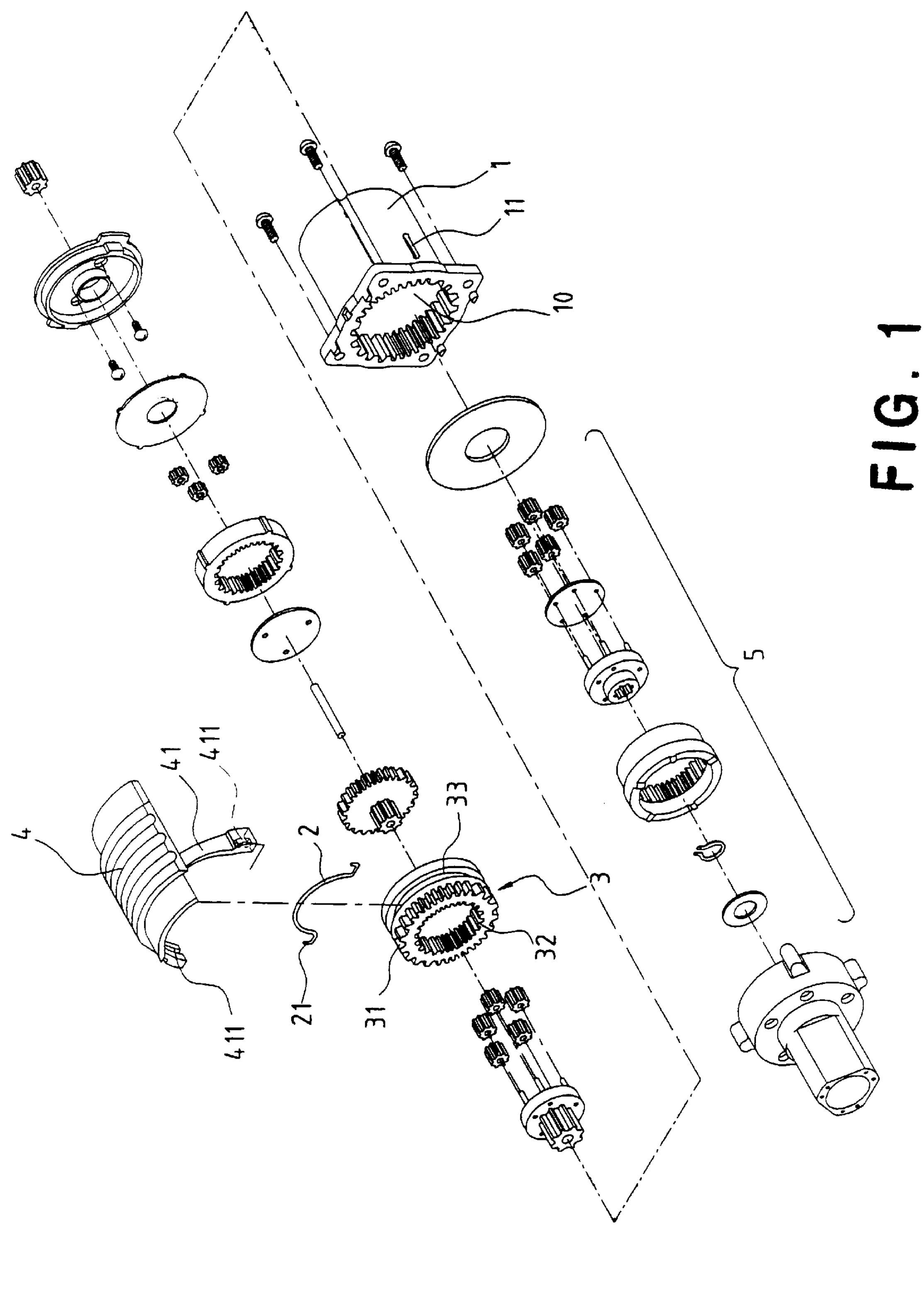
FIG. 1 an exploded view of a switching device in accordance with the present invention and associated parts of a power tool.

With reference to the drawings and in particular to FIG. 1, wherein a reduction gear set of a power tool is shown, the reduction gear set comprises a casing 1, preferably in the form of a cylinder, defining an interior space 10 for accommodating a gear train 5 and a switching device in accordance with the present invention. The switching device of the present invention comprises a switching member 3 in the form of a cylinder movably received in the casing 1. The switching member 3 is driven by a motor (not shown) by means of a planetary gear train and is coupled to a tool bit (not shown) by means of the gear train 5 for selectively driving the tool bit at different output speeds.

The gear train 5 is generally known and constitutes no novel part of the present invention. Thus no further detail regarding the gear train 5 will be given herein.

The casing 1 forms an internal gear 12 on an inside surface thereof and defines two opposite slots 11 in a side wall thereof. The slots 11 extends longitudinally and has a predetermined length.

Figure 2:
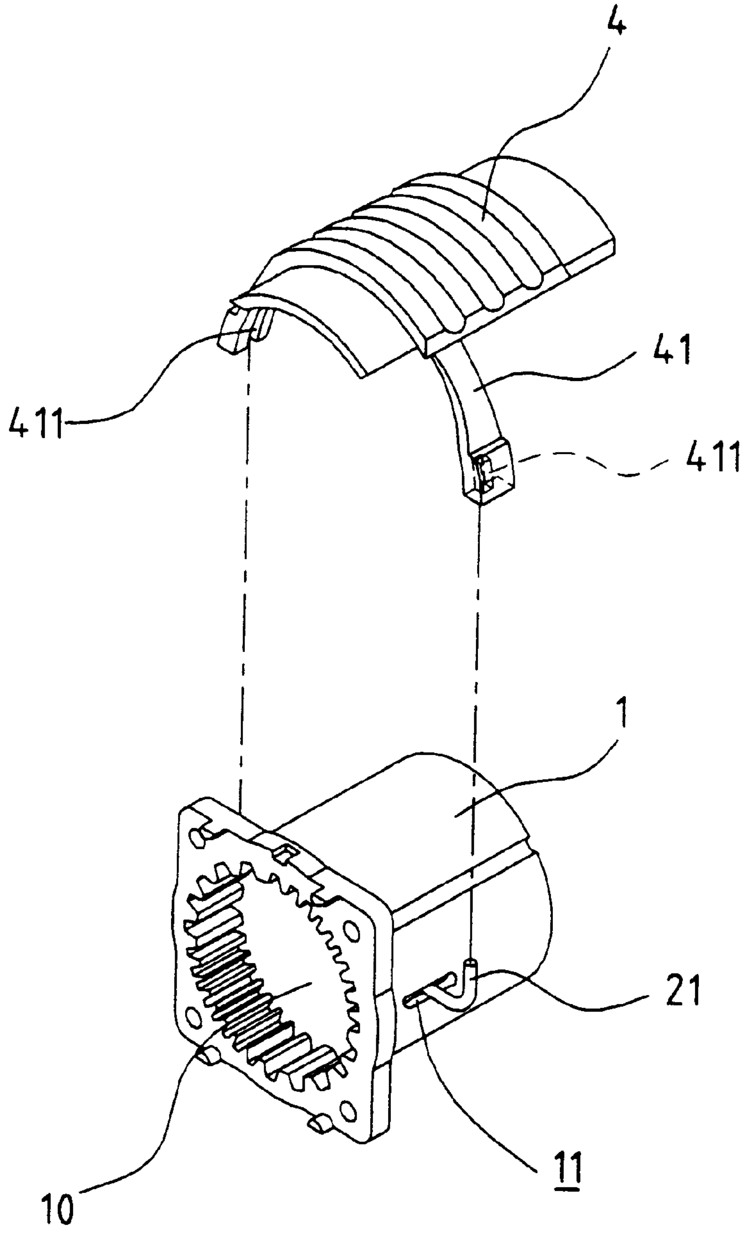
FIG. 2 is a perspective view showing a casing and a manual button of the switching device of the present invention.
Figure 3:
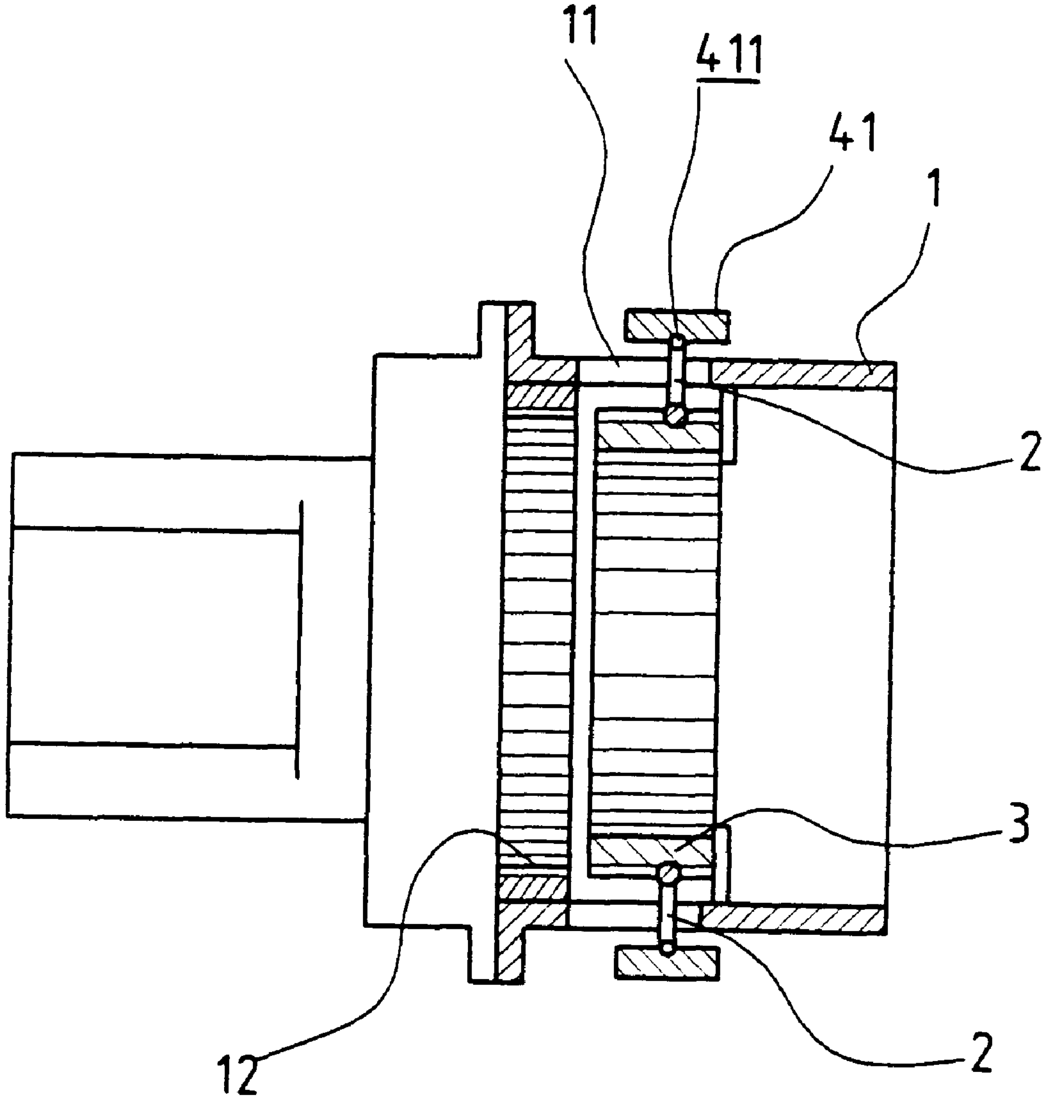
FIG. 3 is a cross-sectional view showing a switching member disengaged from an internal gear o casing.
Figure 4:
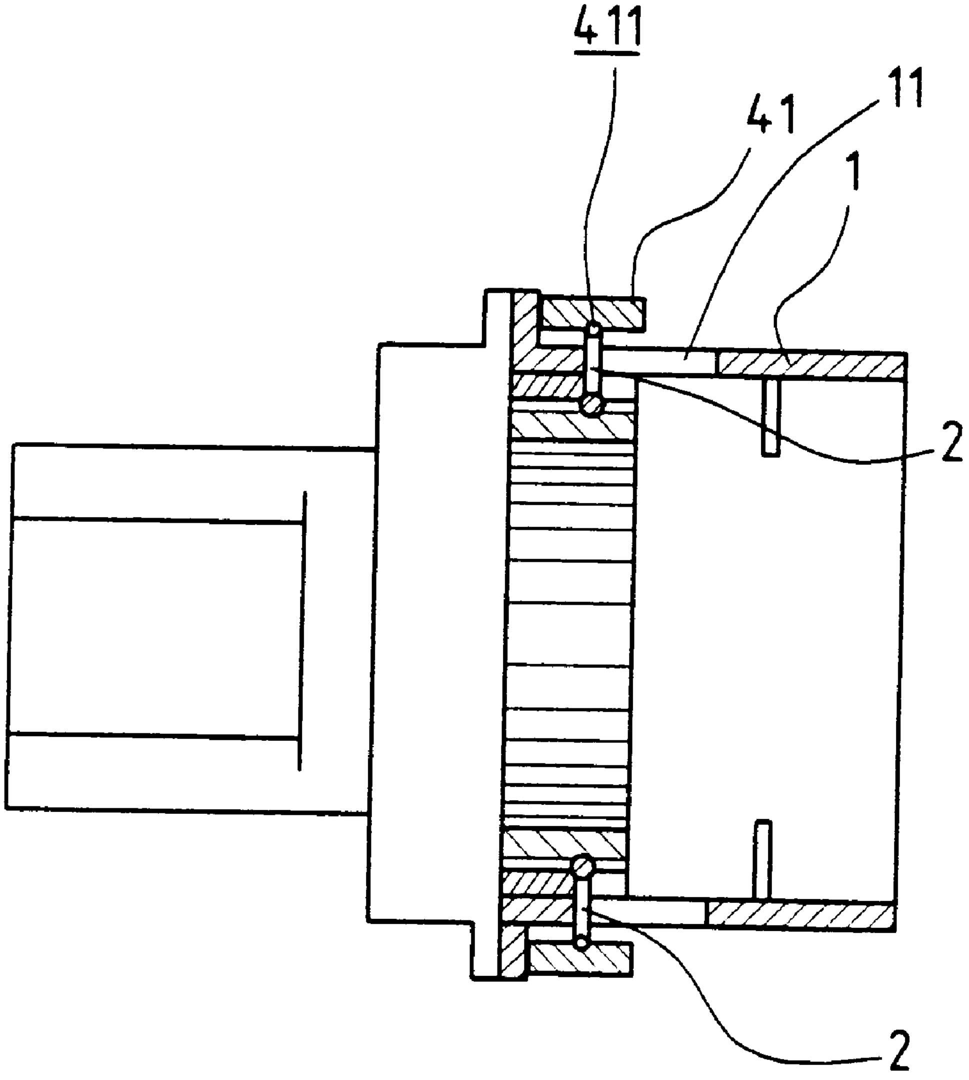
FIG. 4 is also a cross-sectional view, but showing the switching member engaging with the internal gear of the casing.
Figure 5:
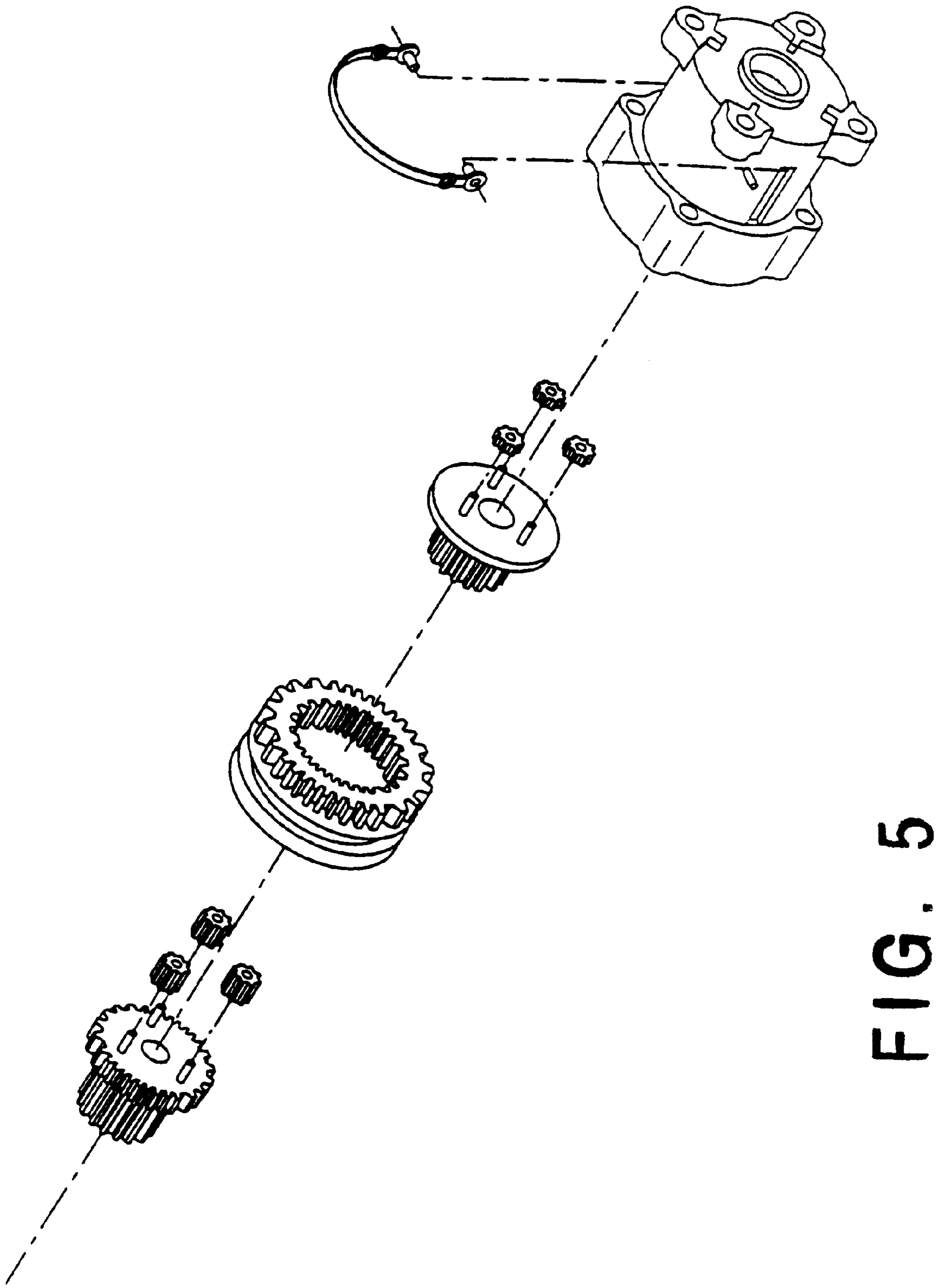
FIG. 5 is an exploded view showing a conventional switching device of a power tool.

The switching member 3 has a cylindrical body forming an outer ring gear 31 on an outside cylindrical surface thereof. A circumferential groove 33 is defined on the outside surface of the switching gear 3 for circumferentially movably receiving and being drivingly engaged by an arc or semi-circular driving member 2 therein. The driving member 2 has two transverse extensions 21 formed on two opposite ends thereof. The switching member 3 is received in the interior space 10 of the casing 1 and axially movable with respect thereto. The transverse extensions 21 of the driving member 2 extend beyond the casing 1 through the slots 11 thereof (FIG. 2). Due to the predetermined length of the slots 11, the transverse extensions 21 are movable with a preset stroke which allows the switching member 3 to move between a first position where the outer ring gear 31 engages with the internal gear 12 of the casing 1 thereby preventing the switching member 3 from rotation (FIG. 4) and a second position where the outer ring gear 31 of the switching member 3 disengages from the internal gear 13 of the casing 1 thereby being freed to rotate (FIG. 3).

A manual button 4 in the form of an elongate arc member is fit over an outside surface of the casing 1 and is movable with respect thereto. The manual button 4 has two transverse tabs 41 each defining a groove 411 for receiving and drivingly engaging with the corresponding transverse extension 21 of the driving member 2 (FIG. 2) whereby by manually moving the button 4 with respect to the casing 1, the switching member 3 is moved between the first and second positions.

The switching member 3 forms an inner ring gear 32 on an inside surface thereof which serves as a ring gear of the planetary gear system and engages with planet gears of the planetary gear system driven by a sun gear of the planetary gear system to drive the tool bit.

Moving the switching member 3 between the first position (FIG. 4) and the second position (FIG. 3) frees/prohibits the rotational motion thereof which in turn changes output speed of the planetary gear system associated therewith thereby changing the output speed of the tool bit driven thereby.

It is apparent that although the present invention is illustrated with the description of the preferred embodiment thereof, it is contemplated that there may be changes and modifications in the described embodiment that can be carried out without departing from the scope of the invention which is intended to be limited only by the appended claims. All these variation and modification should be considered within the scope of the present invention.

What is claimed is:

1. A switching device of a reduction gear set coupled to and driven by a planetary gear system for driving an output tool, the switching device comprising:

a casing defining an interior space having an inside surface on which an internal gear is formed, the casing also defining two opposite elongate slots; and a switching member received in the casing and movable between a first position and a second position, the switching member comprising:

a cylindrical body forming an inner ring gear adapted to serve as a ring gear of the planetary gear system and engaging with planet gears of the planetary gear system and an outer ring gear which engages with the internal gear of the casing and thus prevents the switching member from rotation when the switching member is at the first position and disengages from the internal gear of the casing and thus frees the switching member to rotate when the switching member is at the second position, a driving member rotatably fit over the cylindrical body and being axially fixed thereto, the driving member having extensions projecting radially outward beyond the casing through and axially movable along the slots thereof, wherein by manually moving driving member, the switching member is moved between the first and second positions for changing output speed of the tool.

2. The switching device as claimed in claim 1, wherein the driving member comprises an arc body circumferentially movably received in a circumferential groove defined in the outside surface of the cylindrical body of the switching member, the arc body having opposite ends on which the extensions are formed to transversely project through the slots of the casing.

3. The switching device as claimed in claim 2 further comprising a manual button movably fit over an outside surface of the casing, the manual button defining grooves therein for receiving and drivingly engaging with the extensions of the driving member thereby manually moving the button along the outside surface of the casing causes the switching member to move between the first and second positions.

* * * * *